United States Patent
Powell, Jr.

(10) Patent No.: US 7,716,779 B2
(45) Date of Patent: May 18, 2010

(54) WINDSHIELD WIPER DRIVE ALIGNMENT

(75) Inventor: Edward S. Powell, Jr., Albany, OR (US)

(73) Assignee: Albany Magneto Equipment, Inc., Jefferson, OR (US)

( * ) Notice: Subject to any disclaimer, the term of this patent is extended or adjusted under 35 U.S.C. 154(b) by 1029 days.

(21) Appl. No.: 11/440,676

(22) Filed: May 24, 2006

(65) Prior Publication Data

US 2006/0265832 A1  Nov. 30, 2006

Related U.S. Application Data (60) Provisional application No. 60/685,202, filed on May 31, 2005.

(51) Int. Cl.
*B60S 1/06* (2006.01)
*B60S 1/16* (2006.01)

(52) U.S. Cl. .............. 15/250.31; 15/250.3; 29/592

(58) Field of Classification Search ............ 15/250.31, 15/250.32, 250.43; 29/592; 296/96.15, 96.17; 384/295; 403/326; *B60S 1/06, 1/16, 1/34, B60S 1/58*
See application file for complete search history.

(56) References Cited

U.S. PATENT DOCUMENTS

| | | | |
|---|---|---|---|
| 1,913,308 A | 6/1933 | Hueber et al. | |
| 2,533,963 A | 12/1950 | Sacchini | |
| 3,035,296 A | 5/1962 | Deibel | |
| 3,247,540 A | 4/1966 | Howard et al. | |
| 3,404,423 A | 10/1968 | Howard et al. | |
| 3,644,956 A | 2/1972 | Parker | |
| 3,688,334 A | 9/1972 | Peterson | |
| 3,689,955 A | 9/1972 | Winkelmann | |
| 3,729,766 A | 5/1973 | Buchanan, Jr. | |
| 3,749,431 A | 7/1973 | Schmid et al. | |
| 3,768,112 A | 10/1973 | Kolb | |
| 3,831,219 A | 8/1974 | Deutscher et al. | |
| 4,009,502 A | 3/1977 | Tamaki et al. | |
| 4,546,518 A | 10/1985 | Harbison et al. | |
| 4,716,612 A * | 1/1988 | D'Alba ................. | 15/250.23 |
| 5,351,423 A | 10/1994 | Vohl | |
| 5,473,955 A | 12/1995 | Stinson | |
| 5,507,585 A | 4/1996 | Diederich et al. | |
| 5,542,145 A | 8/1996 | Buchanan, Jr. et al. | |
| 5,549,286 A | 8/1996 | Vacca | |
| 5,675,862 A | 10/1997 | Reinl | |
| 6,059,294 A | 5/2000 | Gorce | |
| 6,196,752 B1 | 3/2001 | Komiyama | |
| 6,196,754 B1 | 3/2001 | Bruemmer et al. | |

(Continued)

FOREIGN PATENT DOCUMENTS

DE  4400296  7/1995

(Continued)

*Primary Examiner*—Monica S Carter
*Assistant Examiner*—Stephanie Newton
(74) *Attorney, Agent, or Firm*—Chernoff, Vilhauer, McClung & Stenzel, LLP (57) ABSTRACT

A wiper drive system and method for installation of a wiper pivot shaft through a structure whose opposite faces may not be parallel. A mounting body supports a bearing support tube and has a concave front side. A mounting ring surrounds the bearing support tube and has a convex rear side that rests adjustably against the concave front side of the mounting body.

17 Claims, 7 Drawing Sheets

U.S. PATENT DOCUMENTS

| | | |
|---|---|---|
| 6,406,089 B1 | 6/2002 | Zimmer |
| 6,510,580 B1 | 1/2003 | Saitou |
| 6,637,798 B2 | 10/2003 | Hoshikawa et al. |
| 6,718,593 B2 | 4/2004 | Shido |
| 6,901,623 B2 | 6/2005 | Ohashi et al. |
| 2002/0069474 A1 * | 6/2002 | Burkard et al. ............ 15/250.3 |
| 2004/0221413 A1 | 11/2004 | Hultquist et al. |
| 2004/0226128 A1 | 11/2004 | Sugiyama |
| 2004/0253049 A1 | 12/2004 | Bissonnette et al. |

FOREIGN PATENT DOCUMENTS

| | | |
|---|---|---|
| FR | 2789132 | 8/2000 |
| JP | 11048917 A * | 2/1999 |
| JP | 11048917 A * | 2/1999 |

* cited by examiner

WINDSHIELD WIPER DRIVE ALIGNMENT

CROSS-REFERENCE TO RELATED APPLICATIONS

This application claims the benefit of pending provisional patent application Ser. No. 60/685,202 entitled Windshield Wiper Alignment Device for Installation, filed May 31, 2005.

BACKGROUND OF THE INVENTION

The present invention relates to drive assemblies for wiper systems, and particularly relates to alignment of a wiper drive system with a structure through which a portion of the drive system extends.

Motor vehicles, such as motor homes, buses, and large trucks, as well as large boats and ships, often have windshield structures surrounded by body structures that have irregular shapes. In particular, the outside surface may be generally planar, but in a plane which is not parallel with an interior surface of the vehicle or vessel. This lack of parallelism is frequently found, for example, in large motor homes or boats of reinforced and insulated plastic construction.

Structures supporting windshield wiper shafts where they extend through sheet metal panels of automobile bodies are often manufactured to a specific design to suit an intended installation. While this is practical with motor vehicles manufactured in large numbers of the same design, as for motor vehicles or vessels that may be manufactured in very low numbers or as unique designs, there has not previously been a simple and reliable way to align a wiper system drive shaft as desired with respect to such structures.

What is desired, then, is a wiper pivot shaft support assembly that can readily be mounted in a desired orientation in a structure such as a vehicle or vessel wall whose inner and outer surfaces are not parallel with each other.

SUMMARY OF THE INVENTION

The present invention provides a wiper drive assembly and a method of installation of such an assembly with wiper arm pivot shafts aligned as desired, as defined by the appended claims.

In one embodiment, a wiper drive assembly includes a wiper pivot shaft bearing support tube extending from a mounting body whose front face is concave, and also includes an inner mounting ring that has a convex rear side surface that may be positioned selectively in with the concave front face of the mounting body to orient an opposite side of the inner mounting ring as required to fit against an inner surface of a structure such as a wall of a vehicle or a waterborne vessel in which the wiper drive assembly is installed.

In accordance with a method which embodies one aspect of the invention, a wiper arm drive shaft is mounted in a structure by forming a wiper shaft opening through the structure, providing a mounting body with a concave front face and a bearing support tube extending forward from the mounting body. An inner mounting ring is placed around the bearing support tube with a convex surface thereof facing toward the concave front face. Thereafter, the bearing support tube is placed through the wiper shaft opening from a first side of the structure, and a fastener is attached to the bearing support tube on the opposite side of the structure and adjusted to hold the mounting body in a desired position with respect to the structure. The inner mounting ring is thus placed in such a position with respect to the concave surface of the mounting body that the bearing support tube is held in a desired orientation with respect to the structure when an outer face of the inner mounting ring is generally parallel with and resting against an inner side of the structure and the concave and convex surfaces are in mating mutual contact with each other.

The foregoing and other features and advantages of the invention will be more readily understood upon consideration of the following detailed description of the invention, taken in conjunction with the accompanying drawings.

DETAILED DESCRIPTION OF PREFERRED EMBODIMENTS

Figure 1:
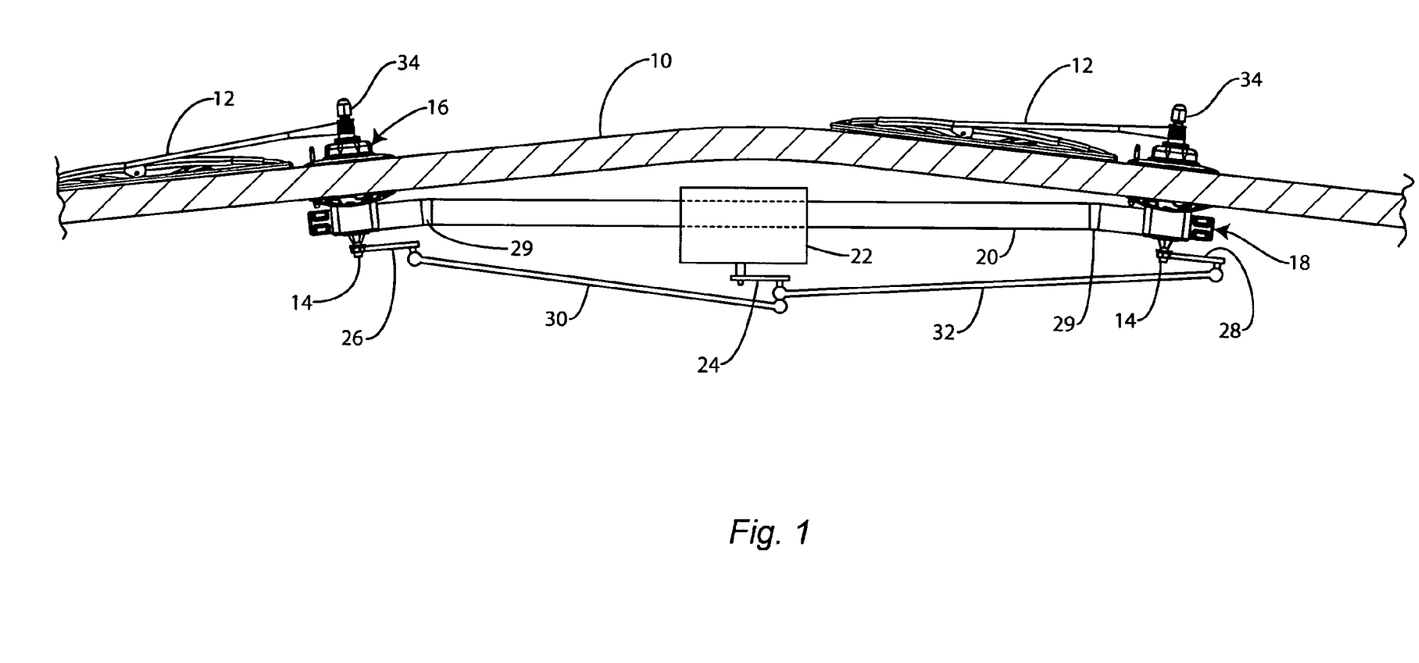
FIG. 1 is a partially schematic sectional top plan view of a portion of a vehicle body with a wiper drive system and a pair of wipers mounted therein.

Referring now to the drawings which form a part of the disclosure herein, in FIG. 1 a portion 10 of a structure such as a motor vehicle body or a portion of a waterborne vessel such as a ship or yacht, is shown in a simplified sectional view. A pair of windshield wipers 12 is located on an outer side thereof. Each of the windshield wipers 12 includes a wiper arm mounted on a respective pivot shaft 14, with both pivot shafts 14 carried in bearings supported in respective wiper arm pivot shaft mounting assemblies 16 and 18 that are interconnected with each other by a spacer 20 which also serves as a drive motor support. A drive motor assembly 22 is mounted on the spacer and drive motor support 20 and includes a crank 24 that is connected to a pair of wiper arm drive levers 26 and 28 by respective connecting rods 30 and 32 shown schematically in FIG. 1.

The spacer and drive motor support 20 may be in the form of a thin-walled metal tube, such as 1.1-inch diameter mild steel tubing with a wall thickness of 0.065 inch, bent as at 29 to fit the location in the vehicle or vessel where the wipers 12 are installed. The spacer and drive motor support 20 serves to support the drive motor assembly 22, to space, interconnect, and steady the mounting assemblies 16 and 18, and to react to the forces imposed on the wiper arm drive levers 26 and 28 by the drive motor assembly 22.

Figure 2:
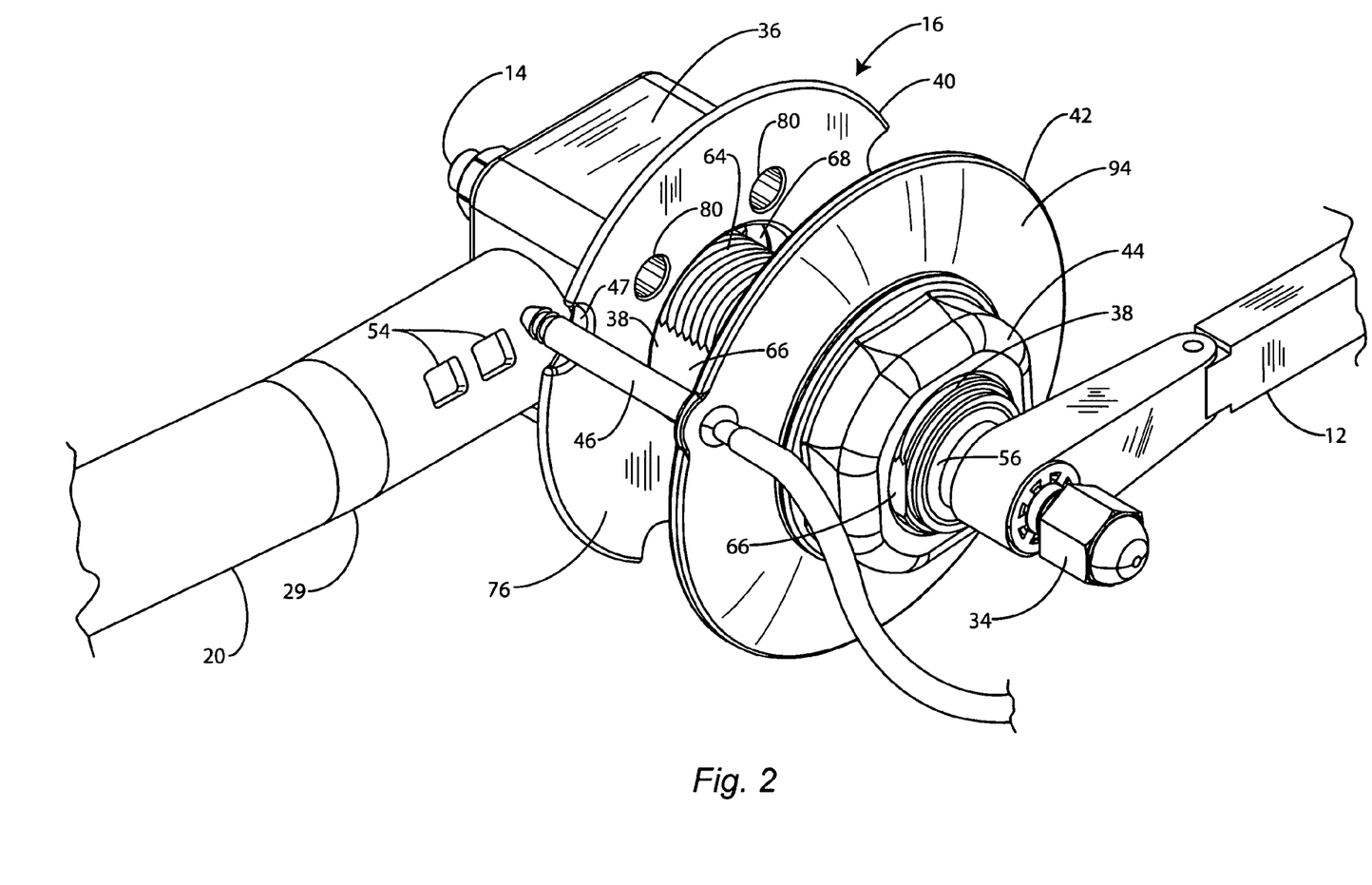
FIG. 2 is an isometric view of a wiper arm pivot shaft mounting assembly similar to one of those shown in FIG. 1.

Referring next to FIG. 2, the wiper arm pivot shaft mounting assembly 16 is shown together with a portion of the spacer and motor support 20, but separate from the portion 10 of the motor vehicle body or vessel structure. The drive arm of the windshield wiper 12 may be mounted to the pivot shaft 14 in a conventional manner, including the use of a wiper arm retaining nut 34 to attach the wiper arm to the outer end of the shaft 14.

A bearing support tube mounting body 36 may conveniently be generally rectangular, and the spacer and motor support member 20 is attached to one lateral side of it, while the bearing support tube 38 extends forward from the body 36. An inner mounting ring 40 encircles the bearing support tube 38 adjacent to the body 36. An outer mounting ring 42 is spaced apart from the inner mounting ring 40 and also encircles the bearing support tube 38. A fastener for holding the outer mounting ring 42 in place, such as a bearing support tube retaining nut 44, located outwardly adjacent to the outer mounting ring 42, is fastened to the bearing support tube 38. A windshield washer tube 46 may be mounted in the outer mounting ring 42 and is shown extending rearwardly from the outer mounting ring 42 and aligned with a corresponding notch 47 in the inner mounting ring 40.

Figure 3:
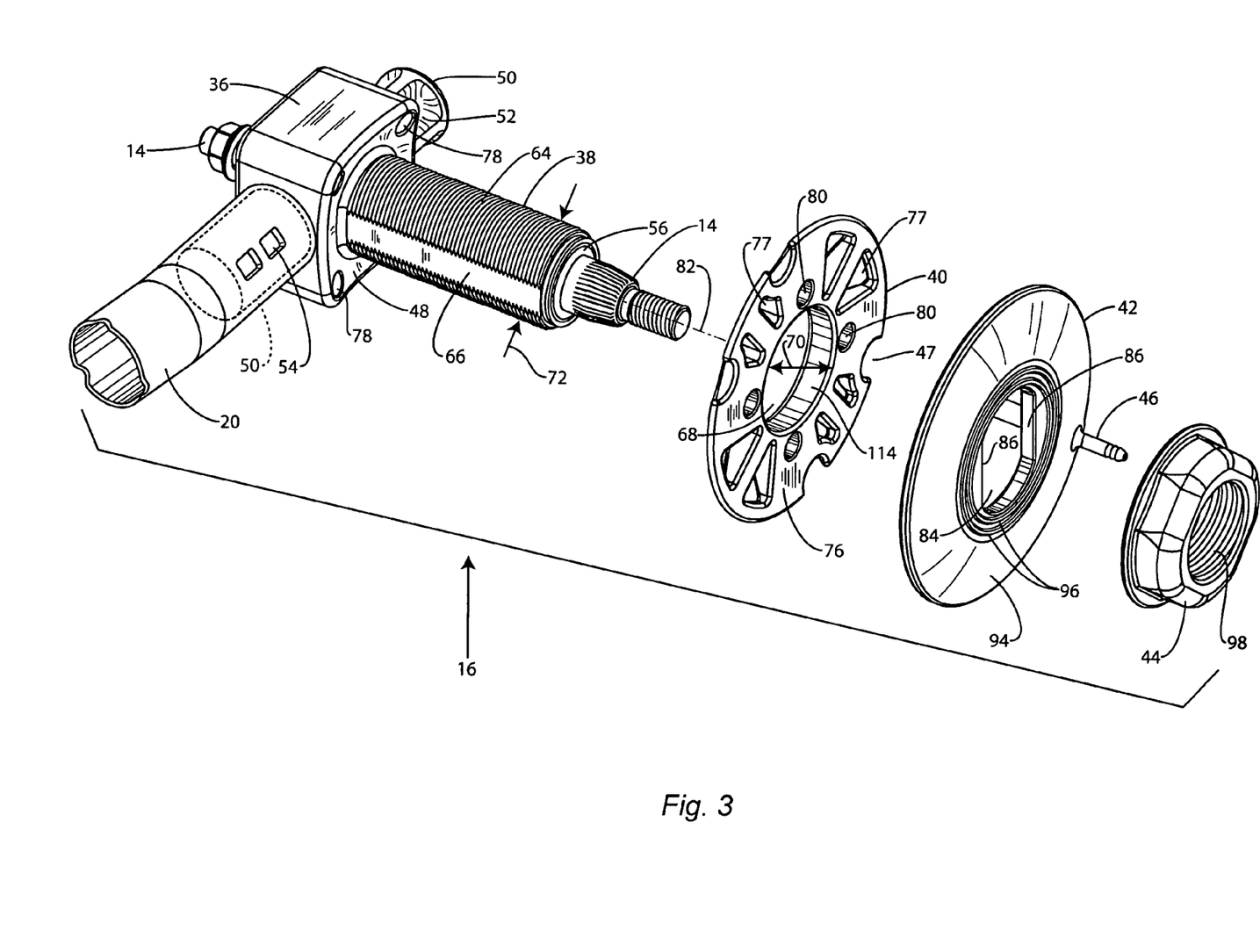
FIG. 3 is an exploded view of the wiper arm pivot shaft mounting assembly shown in FIG. 2, taken from the front thereof.
Figure 4:
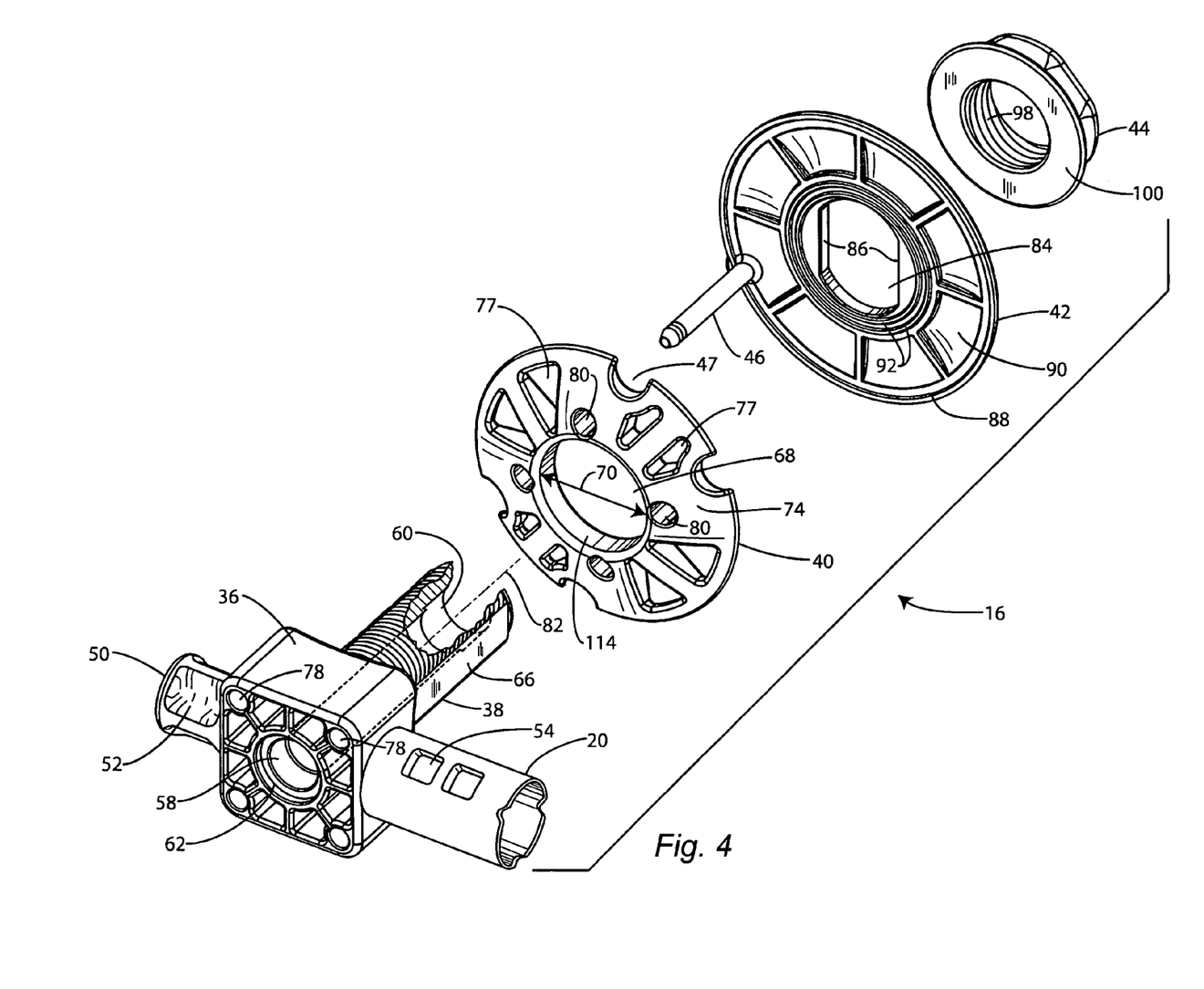
FIG. 4 is an exploded, somewhat simplified view of the wiper arm pivot shaft mounting assembly shown in FIGS. 2 and 3, taken from the rear thereof, with a portion of the bearing support tube thereof cut away.

As may be seen in FIGS. 3 and 4, the front face of the bearing support tube mounting body 36, that is, the side facing outwardly from within the vehicle or vessel as shown in FIG. 1, is mainly a concave surface 48. The bearing support tube 38 extends forward from a generally central location within the concave surface 48. While such a central location may be the preferred arrangement, it will be clear that the bearing support tube 38 might instead be located off-center with respect to the concave surface 48.

A pair of generally cylindrical attachment lugs 50 defines cavities 52. The attachment lugs 50 are provided to receive the tubular motor support 20, which is attached to the bearing support tube mounting body 36 by indentations 54, formed by pressing the tube wall of the spacer and motor support 20, that engage the cavities 52.

A front bearing 56 is located in a front bearing seat 60 provided at the front, or outer, end of the bearing support tube 38. A rear bearing 58 is located in a rear bearing seat 62 at the inner, or rear, side of the bearing support tube mounting body 36, as shown in FIG. 4. The bearings 56 and 58 support the pivot shaft 14.

A helical screw thread 64 is formed on the exterior of the bearing support tube 38, and the bearing support tube 38 has opposite parallel flat sides 66, whose purpose will become apparent presently.

The inner mounting ring 40 defines a central opening 68 having a diameter 70 that is somewhat greater than the diameter 72 of the bearing support tube 38, and a rear side 74 of the inner mounting ring 40 has a generally convex surface shape. The diameter 70 of the central opening 68 may be greater than the diameter 72 of the bearing support tube 38 by as much as necessary to permit the position of the inner mounting ring 40 to be adjusted with respect to the bearing support tube 38 and the concave surface 48 so that a front side 76 can be reoriented through an angle of a few degrees with respect to the bearing support tube mounting body 36. The concave front face 48 of the bearing support tube mounting body 36 and the rear side 74 of the inner mounting ring 40 may be spherical in shape and both may preferably have a similar radius of curvature, so as to fit matingly against each other. It will be understood, however, that the curvatures of the surfaces 48 and 74 need not be precisely similar, and, for example, a radius of curvature of the rear side 74 slightly larger than the radius of curvature of the concave surface 48 would be workable.

The front side 76 of inner mounting ring 40 is generally planar and faces toward the body portion 10 of the motor vehicle as shown in FIG. 1. The inner mounting ring 40 may be pierced by several holes 77, as shown, primarily to reduce the amount of material required for the inner mounting ring 40, which may be of a convenient material such as injection-molded plastics or cast metal. The bearing support tube 38 and its mounting body 36 may be of similar material but are preferably of cast metal, such as aluminum.

A set of bores 78, defined in the corners of the bearing support tube mounting body 36, and a set of holes 80 in the inner mounting ring 40 correspond in size and location so that in some instances the rear inner mounting ring 40 might be aligned with the bearing support tube mounting body 36 with the front side 76 of the inner mounting ring 40 perpendicular to the pivot shaft 14 and the longitudinal central axis 82 of the bearing support tube 38. More frequently, however, the inner mounting ring 40 will be positioned off-center with respect to the bearing support tube 38, so that the central axis 82 is not normal to the front side 76 of the inner mounting ring, as will be explained presently.

The outer mounting ring 42 defines a central opening 84 that, rather than being circular, is shaped to fit over the bearing support tube 36 but not rotate freely about it. The central opening 84 thus may have a pair of opposite straight sides 86 that may be equal chords of a circle. The central opening 84 is large enough to receive the bearing support tube with the flat sides 66 of the bearing support tube aligned with the straight sides 86 of the central opening 84. The straight sides 86 are close enough together so that the outer mounting ring 42 is prevented from rotating freely about the bearing support tube 38, yet the central opening 84 provides enough clearance from the bearing support tube 38 to permit the outer mounting ring 42 to move through a small angle with respect to the central axis 82 of the bearing support tube 38, in order to conform to the orientation of an outer face of a portion 10 of a vehicle or vessel where the assembly 16 is to be installed.

At least one outer sealing ring 88, in the form of a narrow, raised, preferably resilient, ridge, is provided, extending along the periphery of the inwardly facing side 90 of the outer mounting ring 42. At least one similar inner sealing ring 92 is provided, and more may be provided, at a smaller radius, spaced a small distance outward from the central opening 84. The sealing rings 88 and 92 are provided to retard or block entry of air or water around the bearing support tube 38 into a motor vehicle or vessel on which the assembly is mounted. Like the inner mounting ring 40, the outer mounting ring 42 may be made of an injection-molded plastics material, for example, and to enhance the function of the sealing rings 88 and 92, the outer mounting ring 42 may be of a material with at least some resiliency and compressibility.

An outer face 94 of the outer mounting ring 42 may be slightly convex, with a radius of curvature that may be larger than the radius of curvature of either of the concave surface 48 and the convex rear side 74 of the inner mounting ring, since the central axis 82 of the bearing support tube 38 will normally be more likely to be oriented normal, or nearly normal, to the outer surface of a portion 10 of a motor vehicle or vessel body, so that the windshield wiper 12 will be aligned as desired to sweep a windshield which is likely to be generally nearly parallel with the outer surface of body portion 10. As shown herein, a pair of concentric front sealing rings 96, also in the form of narrow ridges, are provided on the outer face 94, circumscribing the central opening 84.

The bearing support tube retention nut 44 includes an internal screw thread 98 that mates with the screw thread 64 on the bearing support tube 38, and may, as are the mounting rings 40 and 42, be molded of a suitably strong plastics material, or may be made of a suitable metal. An inner face 100 of the bearing support tube retention nut 44 may be slightly concave, preferably matching the convexity of the outer face 94 of the outer mounting ring 42 and is large enough to cover and to press sealingly against the sealing rings 96.

A quantity of a sealing compound, such as a room temperature vulcanizing silicone rubber, may be installed along the flat sides 66 of the bearing support tube 38 before tightening the retention nut 44, to complete a rain-excluding sealed installation.

Figure 5:
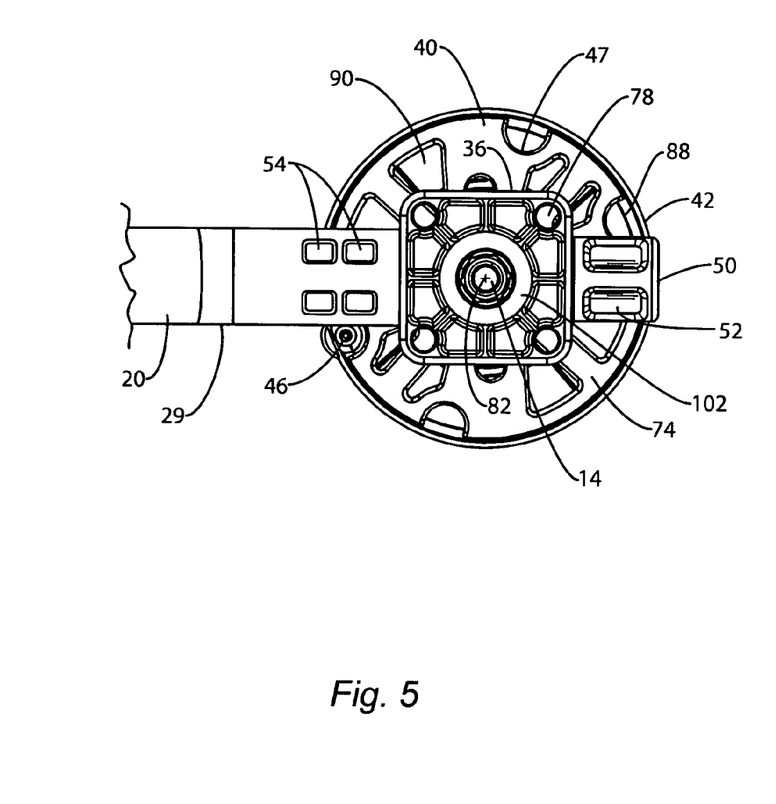
FIG. 5 is a rear elevational view of a wiper arm pivot shaft mounting assembly such as one of those shown in FIG. 1.
Figure 6:
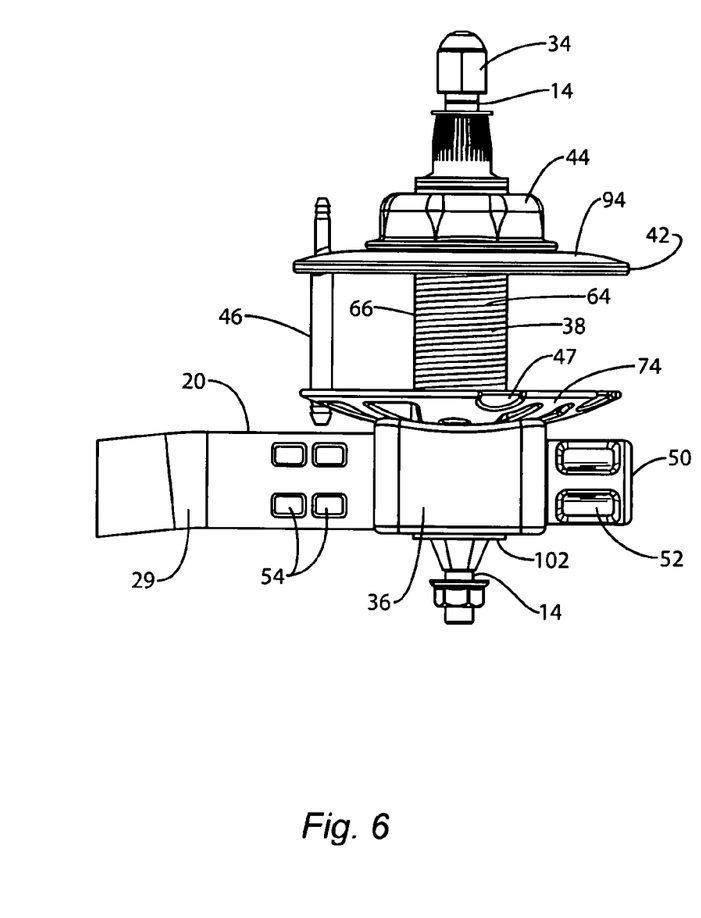
FIG. 6 is a top plan view of the wiper arm pivot shaft mounting assembly shown in FIG. 5.

Referring next to FIGS. 5 and 6, the mounting assembly 18, which is identical with the mounting assembly 16 shown in FIGS. 2-4 except for the location of the attachment of the motor support 20, has its inner mounting ring 40 aligned in a position normal to the central axis 82, and a bearing seal 102 is shown fitted on the pivot shaft 14 behind the rear bearing 58, which is not visible in FIGS. 5 and 6. The windshield washer tube 46 is shown extending into one of the notches 47 in the inner mounting ring 40. The outer mounting ring 42 is shown oriented parallel with the inner mounting ring 40 in FIG. 6, as would be the case in an installation of the mounting assembly 18 through a portion of a vehicle or vessel where the inner face and outer face are parallel with each other.

Figure 7:
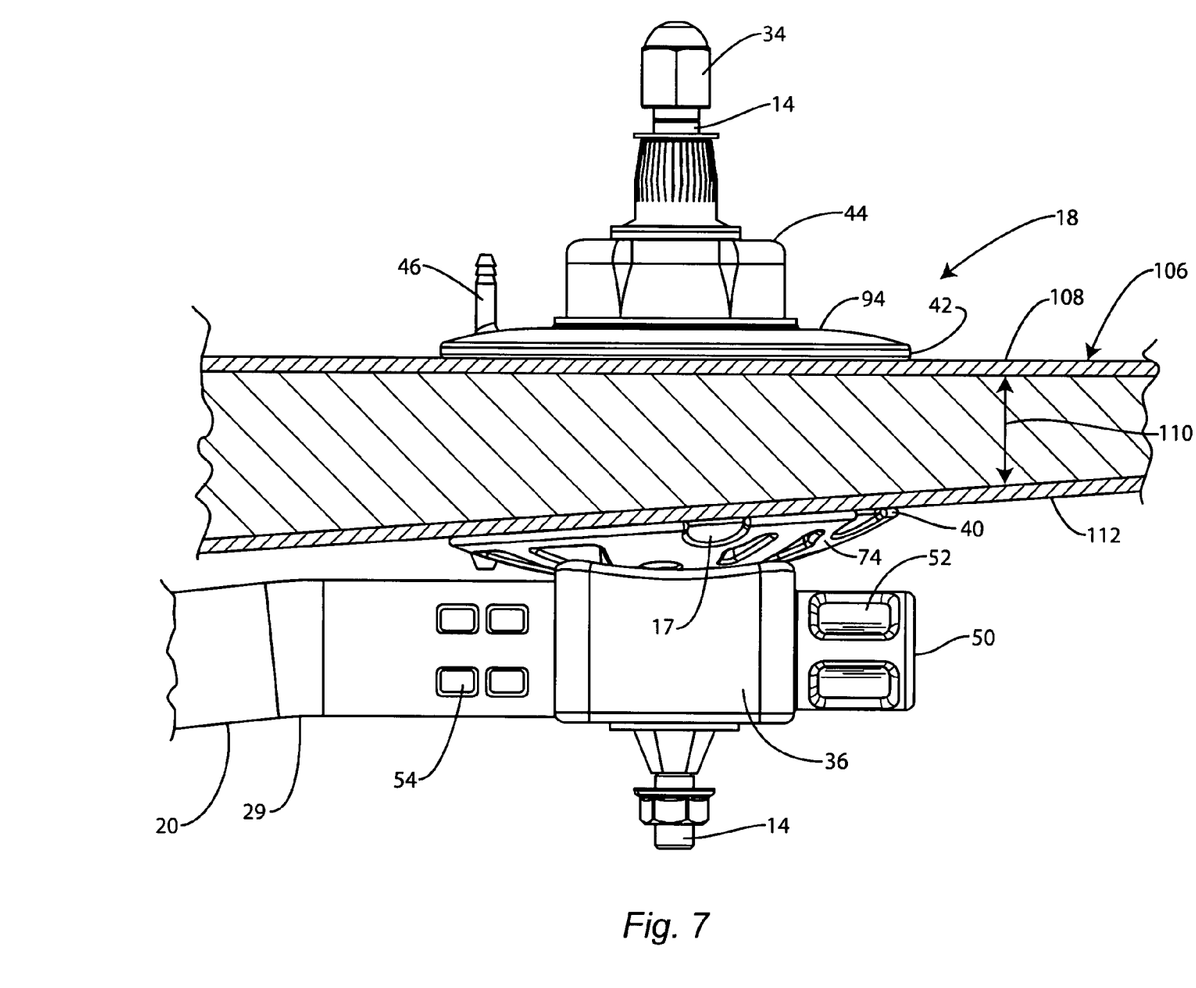
FIG. 7 is a top plan view, at an enlarged scale, of the wiper arm pivot shaft mounting assembly shown in FIG. 6, shown in place in a motor vehicle or vessel body portion shown in section view and having divergent inner and outer faces.
Figure 8:
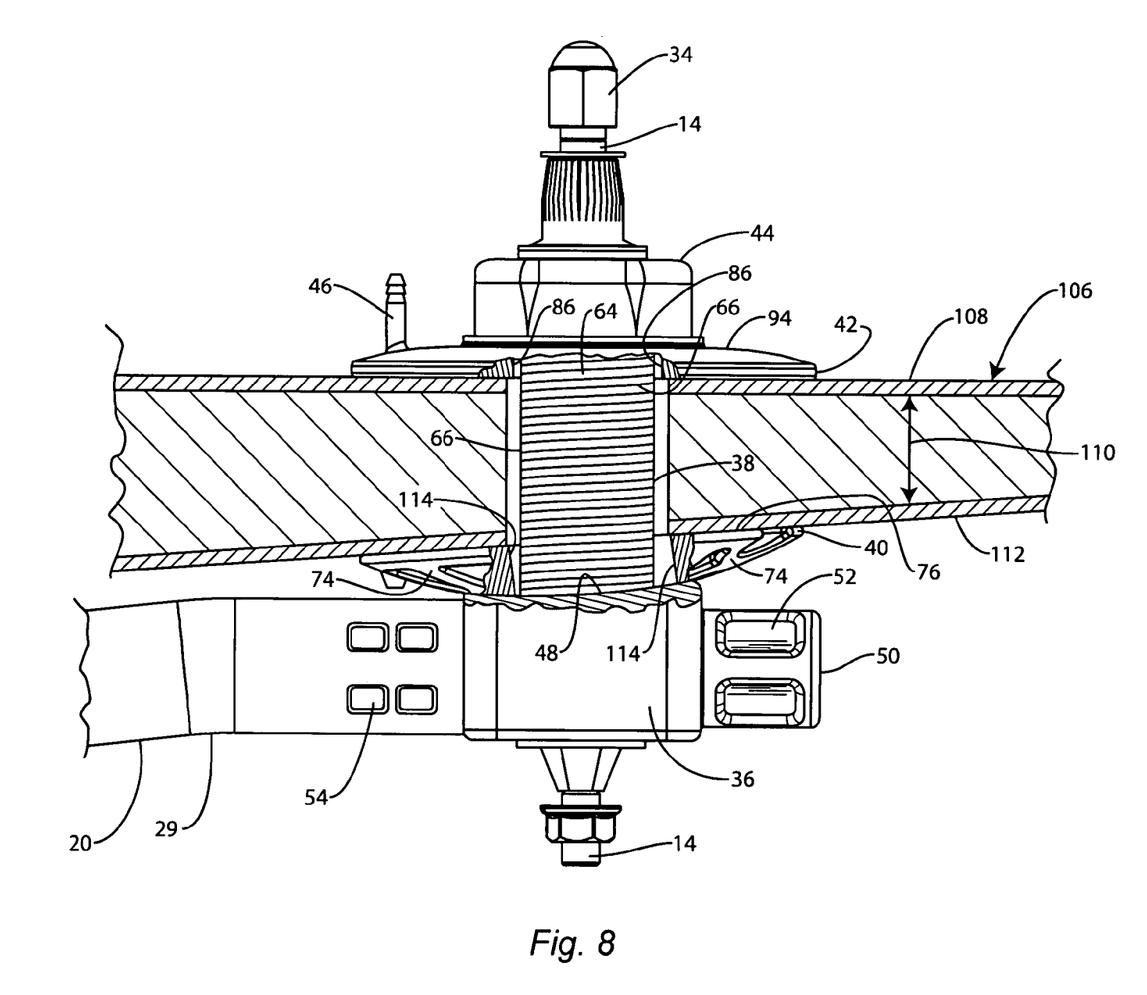
FIG. 8 is a partially cutaway view similar to FIG. 7, showing the relationships between the mounting rings, the mounting body, and the bearing support tube of the mounting assembly.

As shown in FIGS. 7 and 8, however, the wiper drive mounting assembly 18 is installed in a portion 106 of a structure of a motor vehicle or vessel where an outer side 108 is oriented at an angle 110 of several degrees from being parallel with the inner side 112. A secure and stable mounting of the pivot shaft 14 is provided by placing the inner mounting ring 40 off-center with respect to the concave surface 48 of the front side of the mounting body 36. The inner surface 114 of the central opening 68 is thus closer to the bearing support tube 38 on the left side of the view in FIG. 8, and further away from the bearing support tube 38 on the right side of the view. It may also be seen that there is a small amount of space available between each of the flat sides 66 of the bearing support tube 38 and the straight sides 86 of the central opening 84 in the outer mounting ring 42. With the bearing support tube 38 extending outward nearly perpendicular to the outer side 108, as shown in FIGS. 7 and 8, the adjusted position of the inner mounting ring 40 with respect to the concave surface 48 of the bearing support tube mounting body 36 allows a firm pressure to be exerted on the portion 106 of a motor vehicle both by the inwardly facing side 90 of the outer mounting ring 42 and the flat front side 76 of the inner mounting ring 40. Thus, the wiper drive mounting assembly 18 is held securely in position in the portion 106 of a vehicle or vessel when the bearing support tube retention nut 44 is tightened along the threads 64 of the bearing support tube 38 as shown.

With the motor support tube 20 bent appropriately as at 29, a pair of wiper drive assembles 16 and 18, as shown in FIG. 1, may be mounted with the outer portion of the pivot shaft 14 of each approximately normal to the outer side 108 of a body portion 106, even though the pivot shafts 14 of the different mounting assemblies 16 and 18 are not parallel with each other, since the connecting rods 30 and 32 include ball joints at their ends connecting them to the wiper arm drive levers 26 and 28 and to the wiper drive motor crank 24 as shown in FIG. 1.

The terms and expressions employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:
1. A wiper pivot shaft mounting assembly, comprising:
   (a) a mounting body having a concave front face;
   (b) a bearing support tube having an outside diameter, interconnected with said mounting body and extending forward beyond said concave front face thereof;
   (c) an inner mounting ring having a front side and a rear side with a generally convex surface shape fitting in mutual contact with said concave front face, said inner mounting ring defining a central opening surrounding said bearing support tube, the central opening having an inside diameter greater than the outside diameter of the bearing support tube;
   (d) an outer mounting ring separate from said inner mounting ring, the outer mounting ring defining a central opening surrounding said bearing support tube and having an inwardly facing side; and
   (e) a fastening element adjustably mateable with said bearing support tube adjacent an outer face of said outer mounting ring, to urge said inner and outer mounting rings along said bearing support tube toward said mounting body.

2. The assembly of claim 1 wherein said convex rear side of said inner mounting ring and said concave front face of said mounting body are spherical in shape and have similar radii of curvature.

3. The assembly of claim 1 wherein said bearing support tube has a flat side and said central opening in said outer mounting ring has a straight side and said outer mounting ring thereby fits loosely but non-rotatably on said bearing support tube.

4. The assembly of claim 1 wherein said outer mounting ring includes a raised sealing ring on said outer face thereof and said fastening element covers and rests against said sealing ring.

5. The assembly of claim 1 wherein said bearing support tube has an external screw thread defined thereon and wherein said fastening element is a nut having a mating internal screw thread.

6. The assembly of claim 5 wherein said bearing support tube has a non-circular section shape and wherein said outer mounting ring defines a central opening whose shape is related to said non-circular section shape, whereby said outer mounting ring is prevented from rotating with respect to said bearing support tube.

7. The assembly of claim 1 wherein said fastening element has a concave inner face and said outer mounting ring has a correspondingly convex outer face, whereby said outer mounting ring can be positioned with said inwardly facing side thereof oriented at a selected angle with respect to a central axis of said bearing support tube.

8. A wiper drive mounting system for a pair of wipers, comprising a pair of wiper arm pivot shaft mounting assemblies, each comprising:
   (a) a mounting body having a concave front face;
   (b) a bearing support tube having an outside diameter, interconnected with said mounting body and extending forward beyond said concave front face thereof;
   (c) an inner mounting ring having a front side and a rear side with a generally convex surface shape fitting in mutual contact with said concave front face, said inner mounting ring defining a central opening surrounding said bearing support tube, the central opening having an inside diameter greater than the outside diameter of the bearing support tube;

(d) an outer mounting ring separate from said inner mounting ring, the outer mounting ring defining a central opening surrounding said bearing support tube and having an inwardly facing side; and (e) a fastening element adjustably mateable with said bearing support tube adjacent an outer face of said outer mounting ring, to urge said inner and outer mounting rings along said bearing support tube toward said mounting body.

9. The mounting system of claim 8 wherein said mounting body of each said mounting assembly includes an attachment lug, and wherein said mounting assemblies are interconnected by a spacer tube having opposite ends, each of said opposite ends being attached to said attachment lug of said mounting body of a respective one of said mounting assemblies.

10. The mounting system of claim 9 wherein a wiper drive motor assembly is attached to said spacer tube.

11. A method of mounting a wiper arm drive shaft, comprising:

(a) forming a wiper shaft opening through a structure;

(b) providing a mounting body with a concave front face and a bearing support tube attached to and extending forward from the mounting body;

(c) placing an inner mounting ring around the bearing support tube with a convex surface thereof facing toward said concave front face of said mounting body;

(d) thereafter, while keeping said inner mounting ring around the bearing support tube, inserting said bearing support tube into said wiper shaft opening from a first side of said structure, keeping said mounting body and said inner mounting ring on said first side of said structure;

(e) attaching a fastener to said bearing support tube at an opposite second side of said structure and adjusting said fastener to hold said mounting body and bearing support tube in a desired position with respect to said structure; and (f) while adjusting said fastener, holding the inner mounting ring in such a position with respect to the concave surface of said mounting body that said bearing support tube is in a desired orientation with respect to a said second side of said structure when a front side of the inner mounting ring is generally parallel with and resting against said first side of said structure and said concave front face of said mounting body and said convex surface of said inner mounting ring are alongside and in mutual contact with each other.

12. The method of claim 11 including the steps of placing an outer mounting ring on said bearing support tube adjacent said second side of said structure after said step of inserting said bearing support tube into said wiper shaft opening and prior to attaching said fastener to said bearing support tube, and thereafter tightening said fastener to hold said inner and outer mounting rings firmly against said first and second sides of said structure.

13. The method of claim 11 wherein said bearing support tube includes an external thread and said fastener is a matingly threaded nut.

14. The method of claim 12 wherein said structure is a body part of a motor vehicle.

15. The method of claim 12 wherein said structure is a part of a waterborne vessel.

16. The assembly of claim 1 wherein said bearing support tube has a central axis and said inner mounting ring can be positioned with respect to said mounting body so that said front side is oriented at a selected angle with respect to said central axis.

17. The wiper drive mounting system of claim 8, wherein for each of said mounting assemblies said bearing support tube has a central axis and said inner mounting ring can be positioned with respect to said mounting body so that said front side is oriented at a selected angle with respect to said central axis.

* * * * *

UNITED STATES PATENT AND TRADEMARK OFFICE
CERTIFICATE OF CORRECTION

| | | |
|---|---|---|
| PATENT NO. | : 7,716,779 B2 | Page 1 of 1 |
| APPLICATION NO. | : 11/440676 | |
| DATED | : May 18, 2010 | |
| INVENTOR(S) | : Edward S. Powell, Jr. | |

It is certified that error appears in the above-identified patent and that said Letters Patent is hereby corrected as shown below:

Column 1, Line 48, should read --in contact with-- instead of "in with"

Column 2, Line 10, should read --BRIEF DESCRIPTION OF-- instead of "DESCRIPTION OF"

Signed and Sealed this
Fifth Day of July, 2011

David J. Kappos
*Director of the United States Patent and Trademark Office*